United States Patent
Smith, II

(10) Patent No.: US 6,761,422 B2
(45) Date of Patent: Jul. 13, 2004

(54) INK RATIONING BASED ON PAGE COMPOSITION

(75) Inventor: Donald X. Smith, II, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 10/001,648

(22) Filed: Oct. 30, 2001

(65) Prior Publication Data

US 2003/0081020 A1 May 1, 2003

(51) Int. Cl.[7] .......................... B41J 29/38; B41J 2/205
(52) U.S. Cl. ........................ 347/5; 347/14; 347/15
(58) Field of Search ............................ 347/15, 5, 7, 19, 347/12; 358/1.15, 1.16, 75.78, 80, 49; 101/365–367; 399/25, 24, 27, 30

(56) References Cited

U.S. PATENT DOCUMENTS

| | | | |
|---|---|---|---|
| 4,935,751 A | 6/1990 | Hamlin | 346/140 R |
| 5,699,091 A | 12/1997 | Bullock et al. | 347/19 |
| 5,788,388 A | 8/1998 | Cowger et al. | 400/703 |
| 6,145,947 A | * 11/2000 | Inora et al. | 347/7 |
| 6,189,993 B1 | * 2/2001 | Mantell | 347/15 |
| 6,209,995 B1 | * 4/2001 | Grune et al. | 347/85 |
| 6,450,093 B1 | * 9/2002 | Jentzsch et al. | 101/365 |
| 6,476,927 B1 | * 11/2002 | Schwarz, Jr. | 358/1.15 |

FOREIGN PATENT DOCUMENTS

WO    WO 00/76204    12/2000    ............ H04N/1/32

* cited by examiner

Primary Examiner—Stephen D. Meier
Assistant Examiner—An H. Do

(57) ABSTRACT

The print content is received and parsed to determine if different priority levels have been assigned to any section of the content. If any section of the content has been assigned a priority level, an ink rationing process is invoked. The manner in which the content is printed depends on the ink supply level and the priority assigned to each section. If the ink supply level is low and a particular section has been assigned a low priority, that section is printed in grayscale or degraded in some other way that uses less ink. Other higher priority sections of the content are printed in normal mode.

21 Claims, 3 Drawing Sheets

201 — ADVERTISEMENT

205 — IMAGE

210 — TEXT

FIG.2

INK RATIONING BASED ON PAGE COMPOSITION

FIELD OF THE INVENTION

The present invention relates generally to printing. Particularly, the present invention relates to the prioritization of print documents in order to conserve ink.

DESCRIPTION OF THE RELATED ART

A typical inkjet printer has at least one ink pen that reciprocates over a printable surface such as a sheet of paper. The pen includes a print head having an array of numerous orifices through which droplets of ink are expelled onto the surface of a paper to generate a desired pattern. Color inkjet printers generally have either a multi-chamber cartridge or several ink pens, each cartridge or pen containing a different color of ink.

Typically, each pen is comprised of electronics that can communicate information about the contents of the pen to a computer that is coupled to the printer. This information can include the manufactured date, ink color, and/or the quantity of ink in the pen.

With the capability of networks and remote processing of transactions, a computer user can subscribe to an information service that automatically downloads information for printing. For example, Hewlett-Packard's Instant Delivery service provides subscribers with automatic, periodic downloads of information that is printed. Additionally, a user may transmit a document from his office computer to a printer in another building or to his home printer. The user can then pick-up the document when he is in the vicinity of that particular printer.

A problem results when the printer is running low on ink and a print-job in the print queue requires more ink than is present in the printer. Normally, the printer would inform a directly coupled computer that it is running low or is out of ink. This enables the user to replace or refill the empty ink pen and continue printing. However, if the printer is remote to the computer, as described above, an alert message typically cannot be transmitted back to the user. When the user picks up the printout, it may be missing multiple pages due to the lack of ink. The user must then replace the ink and go back to his computer to reprint the print-job. If the printer is miles from the user's computer, this could be very inconvenient. There is a resulting need for a way to ration an ink or toner supply according to the content of the document to be printed.

SUMMARY OF THE INVENTION

The present invention encompasses a method for rationing and an apparatus which rations an ink supply. A print job comprising print content is received and parsed before printing. If the print content is assigned a priority level, the print content is printed in a print mode that is appropriate for the priority level. If the print content is not assigned a priority level, the content is printed using a normal print mode.

BRIEF DESCRIPTION OF THE DRAWINGS

FIG. 2 shows a page of content of a typical print job in accordance with the present invention.

DETAILED DESCRIPTION OF THE PREFERRED EMBODIMENT

The ink rationing process of the present invention provides a printer user with the ability to conserve or ration ink depending on the page content to be printed. The print driver evaluates what type of file is being printed and, if some of the file is set as low priority, prints the low priority portion of the file in grayscale or not at all.

The preferred embodiment of the present invention is related to an inkjet-type printer. However, the present invention encompasses any type of printer that uses printer consumables that can be rationed. These consumables may include ink, toner, or paper. Alternate embodiments could include laser printers.

Figure 1:
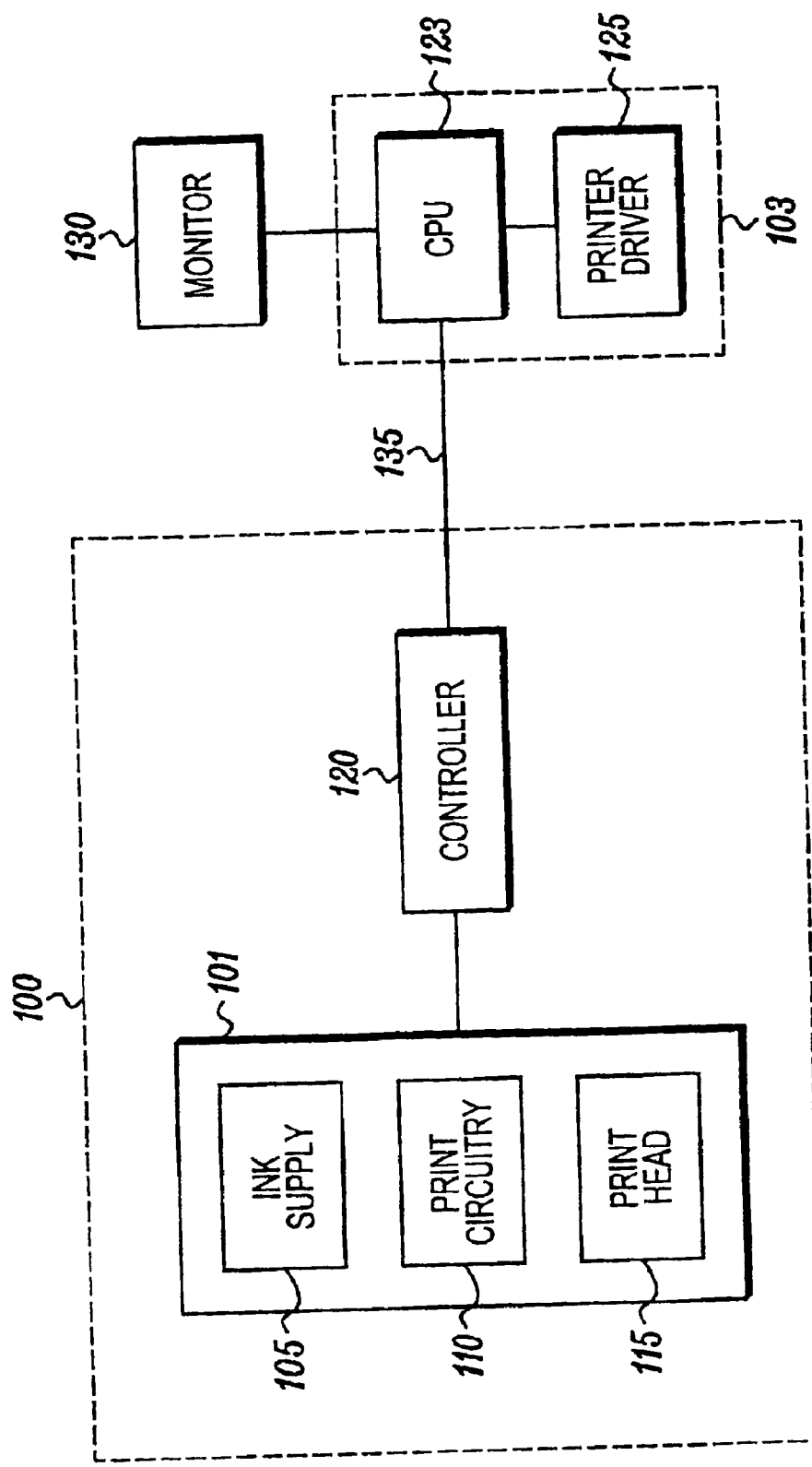
FIG. 1 shows a block diagram of a printer in accordance with the present invention.

FIG. 1 illustrates a typical printer (100) and computer (103) block diagram in accordance with the present invention. In a preferred embodiment, the printer (100) is comprised of a thermal inkjet pen (101) and a printer controller (120).

An inkjet pen (101) is typically mounted on a track on which it moves back and forth over some type of print media, such as paper. As the pen (101) moves, it expels ink in very small droplets through the print head (115) as required to generate a pattern and/or text on the media. The ink comes from the ink supply (105) in the pen (101).

In an alternate embodiment, the printing device encompasses a laser, heating unit, and photoconductor unit instead of the inkjet pen. In this embodiment, the ink supply encompasses a toner supply. In yet another embodiment, the inkjet pen (101) is a piezoelectric pen, which expels ink using mechanical forces created by a piezoelectric element in response to electrical signals. In a piezoelectric inkjet, the ink supply includes an ink reservoir, not unlike the ink reservoir in a thermal ink jet pen.

Referring again to FIG. 1, print circuitry (110) is responsible for electrically coupling the inkjet pen (101) to the controller (120). The print circuitry (110) is additionally responsible for controlling the print characteristics of the print head (115) and monitoring the ink supply (105) level. The ink supply (105) level is communicated to the controller (120).

There are various methods available for determining the ink supply level. Two such methods are disclosed in U.S. Pat. Nos. 5,788,388 and 4,935,751 that are assigned to the assignee of the present invention.

The detailed operation of a thermal inkjet pen (101), such as print head (115) as well as piezoelectric ink jet pen operation, is well known in the art and is not discussed further. The inkjet pen illustrated in FIG. 1 is only one embodiment of such an inkjet pen. Additionally, other printer embodiments have more than one inkjet pen. For example, color printers may have two or more pens depending on the printing capabilities of the printer. In still another embodiment, the ink supply may be separate from the inkjet pen.

The printer controller (120) is responsible for the overall operation of the printer (100). Data to be printed is transmitted from the computer (103) to the printer's controller (120). The controller (120) is then responsible for formatting the data into the appropriate print commands required by the inkjet pen (101) in order to generate the desired characters or graphics on the print media.

The controller (120) is also responsible for tracking the ink supply (105) levels. The circuitry (110) in the inkjet pen (101) communicates the ink supply levels to the controller (120) which communicates the levels to the computer (103) for display on a printer status panel so as to show to a user, which ink supplies are nearing depletion or empty.

In one embodiment, the printer (100) is coupled to a computer (103). The computer is comprised of a central processing unit (CPU) (123) that controls the operation of the computer (103). The CPU (123) may be a microprocessor, such as POWERPC or PENTIUM-type microprocessors, or some form of microcontroller.

The CPU is additionally responsible for performing a printer driver process (125) that controls the operation of the printer (100). The operation of the printer driver (125) is well known in the art and is not discussed further.

The computer (103) is typically coupled to a monitor (130). The monitor (130) is responsible for displaying information from the CPU (123), information from the printer (100), or information entered on a keyboard by a user.

The printer (100) and the computer (103) can be coupled by various bus structures or network interfaces (135). For example, a Universal Serial Bus (USB), a parallel bus, or any other type of bus may be used to transfer information between the printer (100) and computer (103). Additionally, the printer (100) and computer (103) may be coupled (135) by an Ethernet network, the Internet, or any other network (not shown for clarity).

Figure 2:
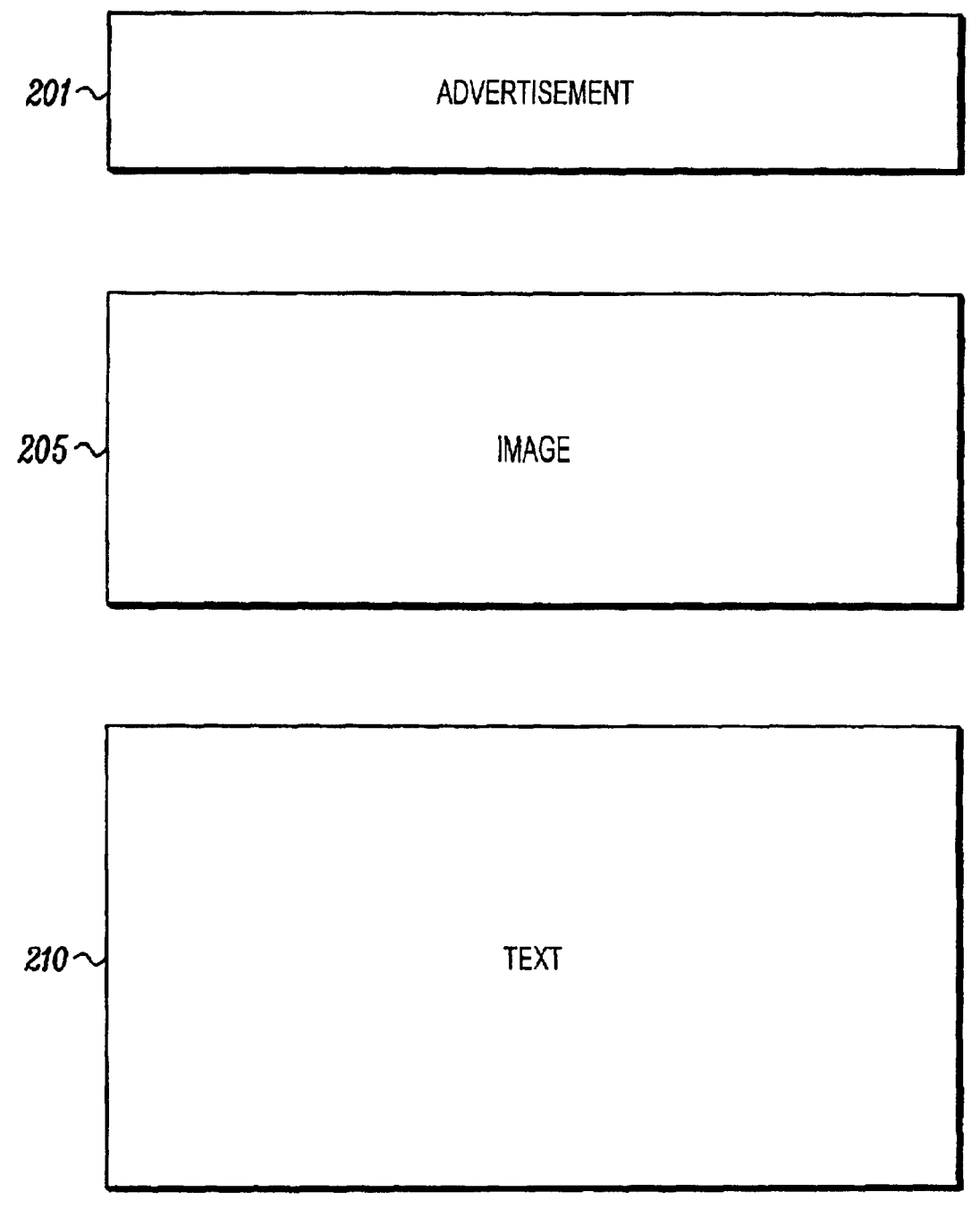

A print job of the present invention may be comprised of multiple pages of content. Each page of content may additionally be comprised of different sections. FIG. 2 illustrates an example of one page of content. In this embodiment, the page is comprised of an advertisement section (201), an image section (205), and a body of text (210) on the subject to which the user has subscribed. Each section may be separated from the other sections by some form of delimiter that is readable only by the printer driver. The type of delimiter depends on the page origination (e.g., HTML, word processor).

In one embodiment, the content of FIG. 2 was generated in Hypertext Markup Language (HTML). This language provides an indication of the composition of each section of the content. For example, the advertisement section (201) may be generated in HTML by the image tag <IMG SRC= "ad.gif">, the image (205) may be generated by the image tag <IMG SRC="image.gif">, and the text (210) by <P>TEXT</P>. A META tag or a plurality of META tags can also be included on the page to indicate a priority of the page or a priority of each section of the page. The above-described HTML commands are well known in the art and are not discussed further.

FIG. 2 is for illustration purposes only and does not limit the present invention to print jobs that are generated with HTML or any particular HTML format. The page of content may be generated in any format by other programs such as MICROSOFT WORD. The various sections of content may also be denoted in other ways.

Figure 3:
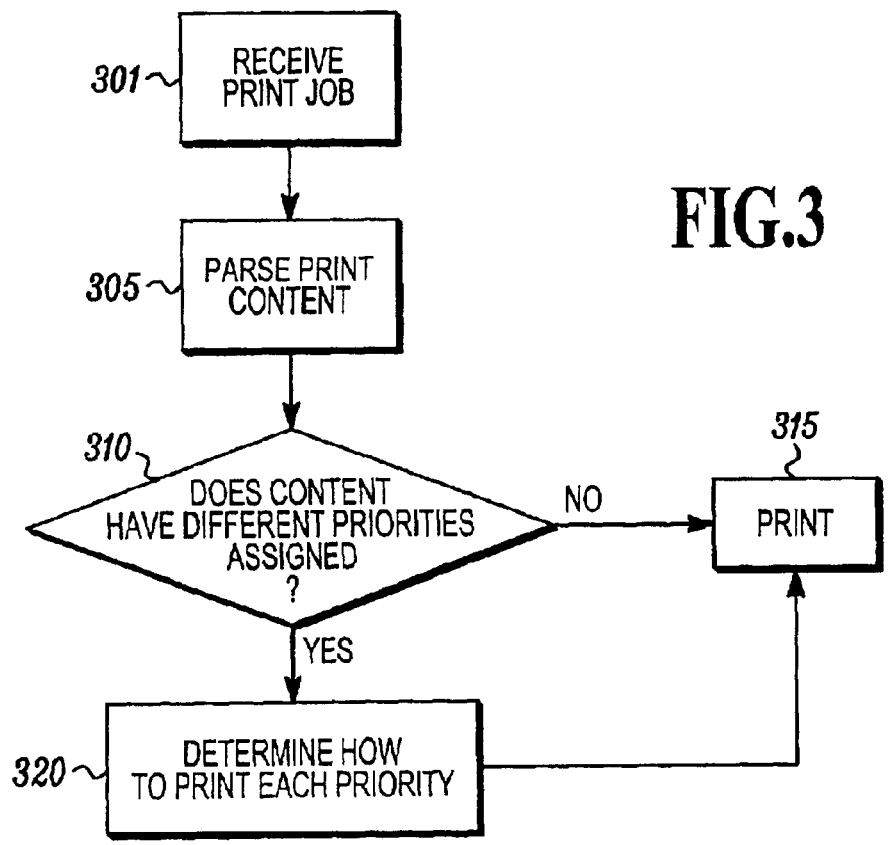
FIG. 3 shows a flowchart of an ink rationing process of the present invention.

FIG. 3 illustrates a flowchart of the ink rationing process of the present invention. This process may be performed by the printer's controller or the computer's CPU. In another embodiment, both the printer and the computer may perform various portions of the process and the results communicated between the two over the bus or network. In yet another embodiment, only the printer's controller is required to perform the ink rationing process. In any embodiment, the controller or CPU is comprised of the structure required to perform the various steps of the present invention.

The process begins when a print job is received (step 301). In one embodiment, the printer driver receives the print job when a computer user selects a file or document to print and activates the print command.

In another embodiment, the print job is received from a network, such as a server on the Internet, and is printed automatically without user intervention. For example, the computer user may subscribe to an Internet news delivery service in which a client program on the computer accesses the web site on a predefined schedule. Once the web site is accessed, preselected information is downloaded and sent to the printer driver by the client program.

The ink rationing process then parses the print job content (step 305) to determine its composition. This step determines the priority of the different sections of the content to be printed. In one embodiment, the printer driver performs the parsing. In an alternate embodiment, the printer's controller performs the parsing step. In this case, the print job is transmitted to the printer in order to determine the priority of the different portions of the content.

The parsing step (step 305) can determine the priority of each page or each section in various ways. One embodiment reads a META tag for the page or a META tag for each section in which the print priority is listed. For example, a META tag may state that a particular section is an advertisement. In another embodiment, the printer driver can determine the contents of the page. The process by which the printer driver determines the contents of the print job is well known in the art and is not discussed further.

Print priority for sections of a document could be determined heuristically when priority information is not embedded into the document or sections within the document. For example, if the content is across the entire width of the page and uses a large amount of color, the image is probably a banner advertisement. If a ".gif" or ".jpg" file is to be printed, the content is most likely an image.

If the content to be printed does not have any priority assigned to it (step 310), the page is printed in a normal fashion (step 315). If the content has been determined to have a priority assigned to at least one section (step 310), the content or the section of the content is printed such that the ink supply is rationed (steps 320 and 315).

The present invention may use one or more levels of priority to determine how a page is printed in order to ration ink. For example, the user, or an application on the user's behalf, can set an advertisement as the lowest priority for printing, an image as a mid-level priority, and any text as high level priority. The user then specifies which priority levels require ink rationing when the ink supply reaches a predetermined level or even multiple levels.

The ink rationing function of the present invention can be accomplished in various ways. In the preferred embodiment, a color image is printed in grayscale. In another embodiment, a graphic image is replaced with a placeholder. Printing an image placeholder instead of an image does not require much ink. For example, an image may be replaced with a line of text stating that a color image has been replaced in order to conserve ink. If the content was generated using HTML, the placeholder may contain information from a META tag that informs the user what was in the image.

The ink rationing function may also conserve ink that is nearing depletion by printing color images using a single color or combination of colors that are abundant or that the usage patterns indicate will be abundant. This embodiment has the benefit of providing the user with a color image albeit in a wrong color.

If multiple priority levels are used and the ink supply is almost exhausted, the lowest priority level content may be printed with a placeholder while the mid-level content is printed in grayscale. This would conserve ink for the high priority text content.

In one embodiment of the present invention, a user can invoke the ink rationing process even if the printer has an ample ink supply. This can be done to save time in printing color intensive graphics that the user deems as unimportant. Or the user may be saving money by using the color ink only when printing content that he desires to see in color.

The process of the present invention enables different sections of a page of content to be assigned various priorities when the page is generated. For example, if a news publisher who gets significant revenue from certain advertisements wishes its readers to view those advertisements, the publisher can set a priority threshold below which the user cannot print the news content if the user's ink rationing process is set to ration ink for that particular page. Alternatively, the publisher may allow the user to pay a subscription fee in order to print a page of content when the ink rationing function is invoked for advertisements as described above. The publisher's threshold can be inserted in a document using a META tag or with some other means of embedding it in the control characters of the content.

The invocation of the ink rationing process is controllable by the user. If the user wishes to use the ink rationing process, he can set the printer to the rationing or draft mode. If the printer is set to the normal print mode, a print job is printed normally until the ink supply is exhausted. Alternatively, the process may inform the user with an error message on the computer or printer that the ink supply is about to be exhausted and ask whether the user wishes to change to the ink rationing mode prior to the start of printing.

Figure 4:
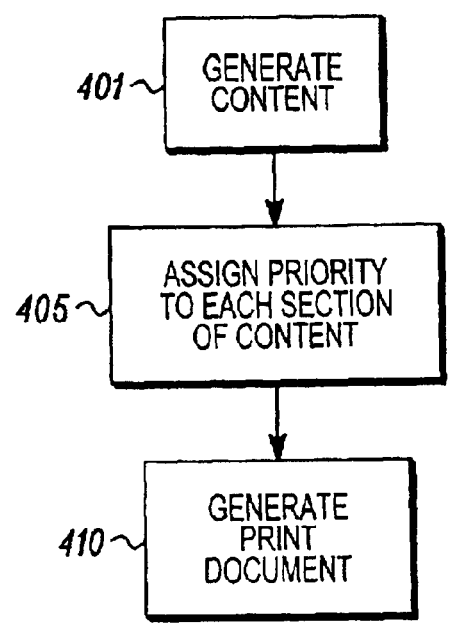
FIG. 4 shows a flowchart of a process for generating a page of content for printing in accordance with the ink rationing process of the present invention.

FIG. 4 illustrates a flowchart of a process for generating a page of content to be printed using the above-described ink rationing process. The page content is generated (step 401) using one or more content generation programs, depending on the type of content generated. For example, if the content comprises text, MICROSOFT WORD can be used. If the content comprises an image, ADOBE PHOTOSHOP can be used.

The print priority level is then assigned to the page or to each different section of the page (step 405). If the content is comprised of images, text, and advertisements, each of these various sections may be assigned a different print priority level. In an alternate embodiment, different pages may each be assigned a separate print priority. The print document is then generated from the content and the assigned priority levels (step 410).

The author of the page may assign a minimum print priority level for a certain section or sections of the page. For example, if the author wishes to limit the user from using the ink rationing process on certain sections of the content (e.g., advertisements), the author sets a minimum print priority level for those particular sections. In one embodiment, this may be accomplished by setting the print priority level in the META tag to a minimum print priority level and the ink rationing process, after reading the minimum level, prints in the normal mode for those particular sections. In another embodiment, the author may charge the user a certain amount in order for the user to print the document using the ink rationing process.

Accordingly, the ink rationing process of the present invention provides a printer with the capability of conserving an ink supply. By printing low priority content in grayscale or not at all, a low-level ink supply can be conserved for the high priority content.

What is claimed is:

1. A method for rationing ink in a printer, the printer having an ink supply for printing content on print media, the method comprising the steps of:

receiving a print job comprising one or more sections of print content identified by metadata in which one or more of the sections of print content are assigned priority levels according to the metadata;

parsing the metadata associated with one or more sections of print content prior to printing the print job;

if a section of print content is assigned a priority level, printing the section of print content in a print mode that is appropriate for the priority level; and if a section of print content is not assigned a priority level, printing the section of print content using a normal print mode.

2. The method of claim 1 further comprising printing each section of print content according to the priority level assigned to that particular section of print content.

3. The method of claim 1 further comprising the steps of printing a first section of print content assigned a low priority level in grayscale; and printing a second section of print content that assigned a high level of priority in the normal print mode.

4. The method of claim 1 and further comprising the step of coupling the printer to a computer.

5. The method of claim 4 wherein the step of parsing is performed by the computer.

6. The method of claim 1 wherein the metadata identifies a type of content selected from a set of content including: images, text and advertisement.

7. A printer having a capability to ration its ink supply in response to the ink supply level, the printer comprising:

a printing device that prints a received print job containing metadata in which one or more of the sections of print content are assigned priority levels according to metadata; and a controller, coupled to the printing device, that controls the printing device in response to the print job, the controller having means for instructing the printing device to print each section of print content in an ink-rationing mode in response to both the ink supply level and the priority level associated with that section of print content.

8. The printer of claim 7 wherein the ink supply comprises a laser printer toner supply.

9. The printer of claim 7 wherein the printing device comprises a thermal inkjet pen.

10. The printer of claim 7 wherein the printing device comprises a piezoelectric inkjet pen.

11. A printer having a capability to ration its ink supply in response to the ink supply level, the printer comprising:

a printing device that prints a received print job on print media, the print job comprising one or more sections of print content identified by metadata in which one or more of the sections of print content are assigned priority level; and a controller, coupled to the printing device, that controls the printing device in response to the print job, the controller comprising means for instructing the printing device to print a first section of content in an ink-rationing mode in response to at least one of the ink supply level and the priority level assigned to the first section by the metadata.

12. A method for generating a print document that can be printed in an ink rationing printer, the method comprising the steps of:

generating content that is comprised one or more sections of print content;

assigning a print priority level to each section of the at least one section of the content; and generating the print document comprising the one or more sections of print content, and metadata in which at least one of the one or more sections of print content is assigned a priority level.

13. The method of claim 12 wherein the at least one print priority level in a minimum print priority level.

14. The method of claim 13 and further including the steps of:

transmitting the print document to a printer having an ink rationing mode, the ink rationing mode printing the content in response to a printer ink supply level and the at least one priority level; and generating a charge of a predetermined monetary value if the print document is printed at a priority level that is less than the minimum print priority level.

15. In a printer comprising an ink supply for printing content on print media, the method comprising the steps of:

receiving a print job comprising one or more sections of print content identified by metadata in which one or more of the sections of print content are assigned priority levels according to the metadata;

parsing the metadata associated with the one or more sections of print content prior to printing the print job;

if the print content is assigned a priority level, printing the print content in a print mode that is appropriate for the priority level; and if the print content is not assigned a priority level, printing the print content using a normal print mode.

16. The printer of claim 15 wherein the ink supply comprises a laser printer toner supply.

17. A printer having a capability to ration its ink supply, the printer comprising:

a printing device that prints a received print job on print media, the print job comprising one or more sections of print content identified by metadata in which one or more of the sections of print content are assigned priority levels according to the metadata; and a controller, coupled to the printing device, that controls the printing device in response to the print job, the controller comprising:

means for parsing the print job to determine the print priority level of each section of content according to the metadata; and means for instructing the printing device to print a first section of content in an ink-rationing mode in response to at least one of the ink supply level and the first section priority level.

18. The printer of claim 17 wherein the ink rationing mode comprises printing in a grayscale mode.

19. In a system comprising a computer coupled to a printer, the printer having an ink supply for printing content on print media and capable of:

receiving a print job comprising one or more sections of print content identified by metadata in which one or more of the sections of print content are assigned priority levels according to the metadata;

parsing the print content to determine at least one print priority level for each section of the at least one section according to the metadata;

generating a print job in response to the content and the at least one print priority level;

transmitting the print job to the printer; and printing the print job in response to the content and the at least one print priority level.

20. The system of claim 19 wherein the step of printing comprises printing the content in an ink rationing mode in response to the at least one print priority level.

21. The system of claim 20 wherein the ink rationing mode comprises printing the content in grayscale.

* * * * *